United States Patent [19]

Furuya et al.

[11] 3,999,978
[45] Dec. 28, 1976

[54] METHOD FOR MAKING STEEL BY THE USE OF A FLUX TREATED BY CARBON DIOXIDE

[75] Inventors: Mitsuo Furuya, Narashino; Shigehiro Kimura; Hiroyuki Kajioka, both of Kitakyushu; Hiroyuki Katayama, Fukuoka; Kiyomi Shio; Arata Tanaka, both of Kitakyushu, all of Japan

[73] Assignee: Nippon Steel Corporation, Tokyo, Japan

[22] Filed: Sept. 29, 1975

[21] Appl. No.: 617,441

[52] U.S. Cl. .................................. 75/53; 75/55; 75/58
[51] Int. Cl.² .................................. C21C 7/04
[58] Field of Search ........................ 75/53–60

[56] References Cited

UNITED STATES PATENTS

| 3,330,645 | 7/1967 | DeMoustier | 75/60 |
| 3,556,773 | 1/1971 | Grenfell | 75/60 |
| 3,771,998 | 11/1973 | Knuppel | 75/60 |

Primary Examiner—Peter D. Rosenberg
Attorney, Agent, or Firm—Watson Leavenworth Kelton & Taggart

[57] ABSTRACT

A quicklime is treated by $CO_2$ gas so as to form a $CaCO_3$ film on the surface of the particle thereof. It serves to prevent moisture absorption so that a steel making process, especially for the production of low hydrogen steel, can be done very effectively with low cost by the use of this $CO_2$-treated lime.

9 Claims, 4 Drawing Figures

METHOD FOR MAKING STEEL BY THE USE OF A FLUX TREATED BY CARBON DIOXIDE

DETAILED DESCRIPTION OF THE INVENTION

This invention relates to a method for making steel in which the content of hydrogen in a molten steel can be decreased by the use of a flux having enhanced moistureproof property.

This invention also relates to such flux and to a method for making the same.

Generally, a great factor to determine the content of hydrogen in a steel is the content of water contained in a flux material. Particularly, the quicklime, or CaO, which is inevitable in refining steel and is usually used in a great amount has strong hygroscopic property, and thus it is a key point in the manufacture of steel, especially low hydrogen steel, how to control the water content of lime at the minimum value. The quicklime can be made by subjecting the limestone to thermal decomposition at a calciner or calcination furnace such as rotary kiln, etc. After calcination, the quicklime is caused to react with the water vapour in the atmosphere and the amount of the water absorbed rapidly increases in a substantially direct line. Accordingly, in order to remove the adverse effect of the water content in the quicklime, it is desirable to use it in a steel making furnace immediately after calcination. It is, however, practically difficult in most cases due to a problem of equipments, and thus the quicklime is often reheated in a special drying furnace before use in an electric furnace, etc. so as to prevent the absorption of moisture before use as far as possible.

A great problem, nevertheless, still remains regarding the hydrogen pick-up caused by the residual water in the flux.

On the other hand, it has been reported that some electric furnace steel maker uses the limestone having substantially no hygroscopic property instead of the quicklime having strong hygroscopic property to decrease the hydrogen content in the steel. However, a major problem encountered in the use of the limestone in an electric furnace is its large decomposition heat which results in the increase of consumption of electric power as well as the inevitable postponement of the time for steel making due to delay of fluxing. It has also been recognized that, in a converter for which the heat source must be restricted, the amount of the limestone to be used must be limited to a great extent, and that the stability of refining process using the limestone is decreased due to insufficient fluxing or increased slopping as compared to the usual refining process using the quicklime.

The quicklime after calcination reacts with water vapor or carbon dioxide in the air as it is cooled whereby it is converted into $Ca(OH)_2$ and $CaCO_3$. The water vapor existing in the usual atmosphere amounts to several ten times, or more than one hundred times in summer, the amount of carbon dioxide, so that the reaction with the water vapor will preferentially proceed.

As a result of many studies, the inventors of this invention have found that, when a fresh quicklime obtained immediately after calcination is brought into contact with an atmosphere of carbon dioxide of low water content to thereby change the surface area of the quicklime particles into the $CaCO_3$ having substantially no hygroscopic property, the subsequent reactivity with the water vapor becomes extremely weakened. The term "surface area" herein used includes not only the outermost surface of the particle but also the internal surface of voids or pores existing inside the particle.

It is therefore an object of this invention to overcome the disadvantages which have been encountered in the prior art.

According to this invention, there is provided a method (1) for making steel which comprises using a flux obtained by contacting a calcined and decomposed limestone and/or dolomite with a $CO_2$-containing gas and converting 2 to 30% of the calcined and decomposed material into $CaCO_3$ and/or $MgCO_3$.

According to this invention, there is also provided a method (2) according to the method (1) which is conducted for reducing refining process.

According to this invention, there is also provided a method (3) according to the method (1) which is conducted for oxidizing refining process.

According to this invention, there is also provided a flux used for making steel which is obtained by contacting the calcined and decomposed limestone and/or dolomite with a $CO_2$-containing gas and converting 2 to 30% of the calcined and decomposed material into $CaCO_3$ and/or $MgCO_3$.

According to this invention, there is also provided a method (4) for making a flux as described above which comprises contacting a calcined and decomposed limestone and/or dolomite with a $CO_2$-containing gas at temperatures ranging between the ordinary temperature and the calcination and decomposition temperature of said limestone and/or dolomite and converting 2 to 30% of the calcined and decomposed material into $CaCO_3$ and/or $MgCO_3$.

According to this invention, there is also provided a method (5) according to the method (4) in which said $CO_2$-containing gas contains at least 20% $CO_2$.

According to this invention, there is also provided a method (6) according to the method (4) in which said reaction is carried out at temperatures between 300° C and 750° C.

According to this invention, there is also provided a method (7) according to the method (4) in which each particle of said calcined and decomposed material is subjected to mutual movement so that the particles and the $CO_2$-containing gas are allowed to react uniformly.

According to this invention, there is also provided a method (8) according to the method (4) in which said reaction is completed at the final temperature of 350° C or less.

According to this invention, there is also provided a method (9) according to the method (5) in which the temperatures between 300° C and 400° C are kept for at least 20 minutes.

According to this invention, there is also provided a method (10) according to the method (4) in which a gas having no more tahn 1% $H_2O$ obtained by dehumidifying a $CO_2$-containing gas produced by decomposition of the starting material is used in said reaction.

In this invention, the limestone includes a material having about 80 to 100% $CaCO_3$, and the dolomite includes a material having about 53% to 66% $CaCO_3$ and about 34% to 47% $MgCO_3$. This invention is applicable to the dolomite in the same manner as to the limestone. Accordingly, some preferred embodiments of this invention are described hereinafter with respect to the use of the limestone and the drawings.

Figure 1:
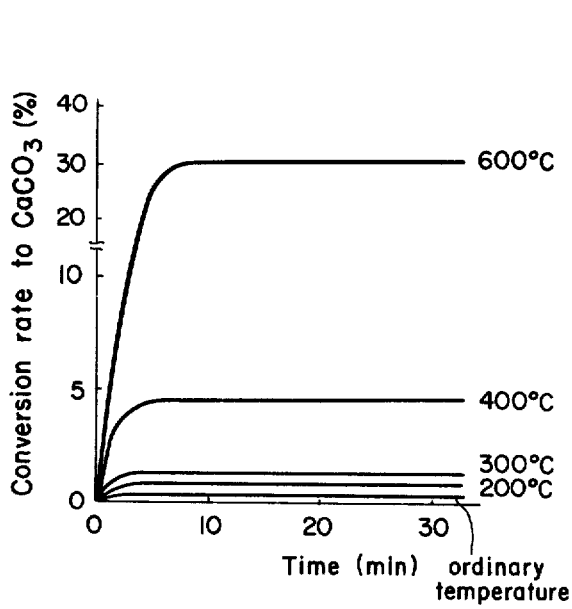
FIG. 1 is a graph showing a relation between the conversion rate to $CaCO_3$ and the time elapse with respect to various temperatures.
Figure 2:
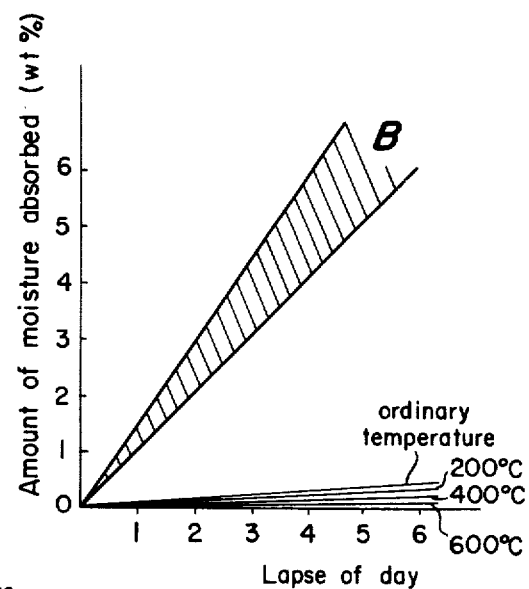
FIG. 2 is a graph showing a relation between the amount of moisture absorbed and the lapse of day with respect to various temperatures.

In FIG. 1, a behavior of reaction between the quicklime and the carbon dioxide, or $CO_2$ is shown which has been determined by the use of a heat balance apparatus. In FIG. 1, the reaction between CaO and $CO_2$ proceeds very rapidly at higher temperatures. At 600° C, the quicklime, or CaO, changes to the $CaCO_3$ in an amount of about 30% by weight in about 10 minutes, while at 200° C to 300° C, it changes in only about 1% or so. At the ordinary temperature, the degree of the change becomes less. FIG. 2 shows a comparison of the moisture-absorption rate between the conventional quicklime and that of this invention wherein the quicklime is allowed to react with the carbon dioxide at the temperatures shown and then stand in air with 75% humidity at 20° C. From this it is seen that the moisture-absorption rate of the quicklime treated by carbon dioxide (A) is about 1/10 or less of that of the non-treated quicklime (B) and the absolute value thereof becomes larger as the time lapse. As to the effect of the treatment temperatures, it has been found that those which have been treated at higher temperatures with higher conversion rate to $CaCO_3$ show lesser absorption rate of moisture but that even those which have been treated at lower temperatures with lower conversion rate to $CaCO_3$ also show a sufficient moisture-proofness. That is, the temperature can be selected between the ordinary temperature and the decomposition temperature of the limestone.

The reaction between CaO and $CO_2$ is possible both in ordinary pressure or under pressurized condition. However, the normal pressure is most preferable since it does not need any means to decrease or increase pressure. The above reaction is an exothermic reaction, which proceeds more rapidly at high temperature than at low temperature. The most reasonable way to commercially obtain the CaO at high temperature is to utilize the heat after calcination. However, the effect obtained is same if the CaO at ordinary temperature is reheated.

The source for $CO_2$ gas may be a commercially pure $CO_2$ gas, or an exhaust gas from the calciner which have been dehydrated so as to contain no more than 1% $H_2O$, etc. If it contains more water or $H_2O$, the production of $Ca(OH)_2$ is promoted with undesirable result.

Figure 3:
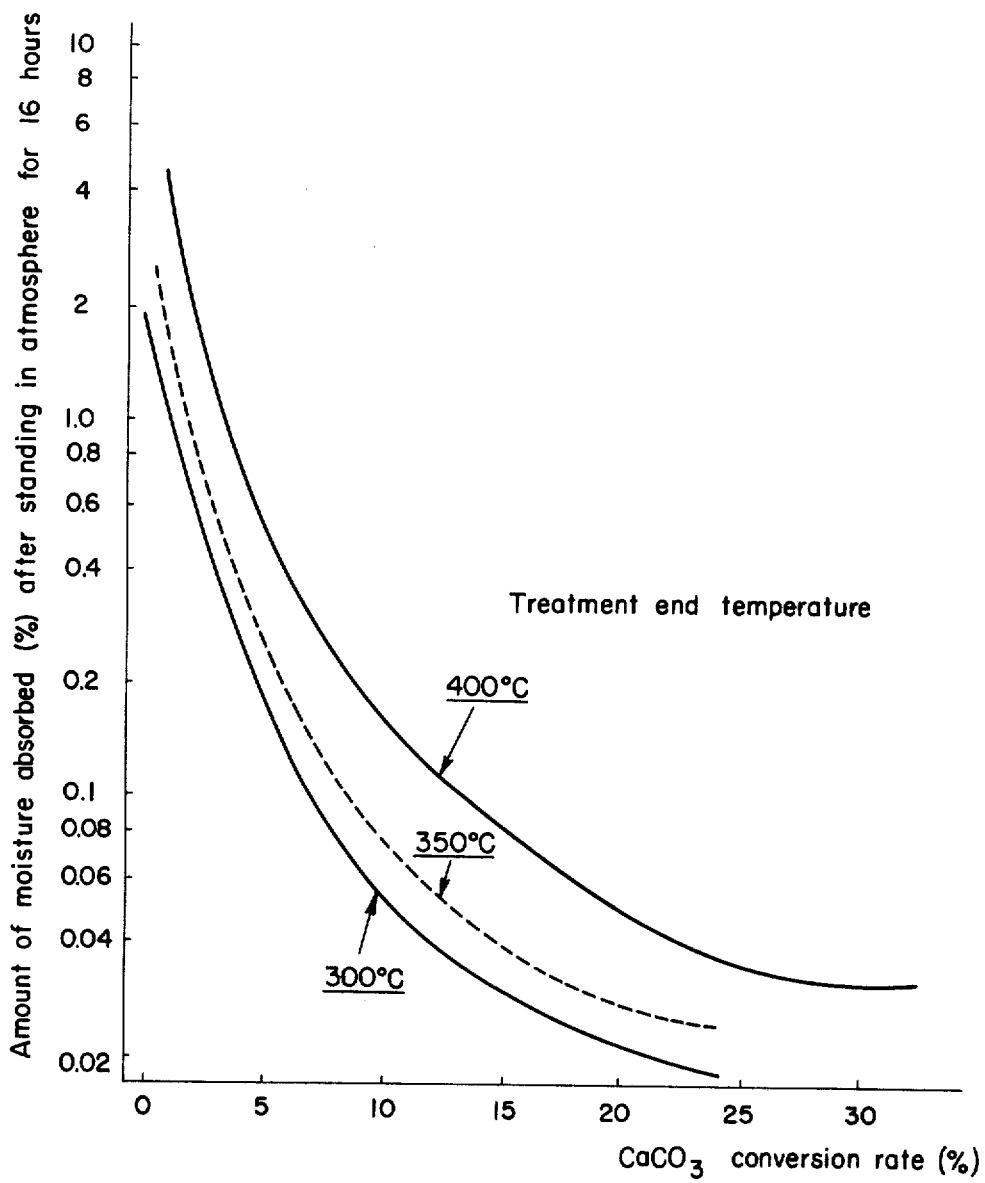
FIG. 3 is a graph showing the effect of $CaCO_3$ conversion rate and the reaction condition upon the amount of moisture absorbed by the treated lime.

FIG. 3 shows a relation between the conversion to $CaCO_3$ and the moisture-proofness in case that CaO and $CO_2$ gas are allowed to react under various conditions of temperatures (ordinary temp. to 750° C) and times (10 minutes to 360 minutes). As the conversion to $CaCO_3$ increases, the moisture-proofness is improved. When a quicklime treated with the conversion rate of 2 to 30% is used, the following result is obtained.

The surface of all walls of the particle including pores of the quicklime is coated with a film of non-hydrated $CaCO_3$ so that the hygroscopic property thereof can be lowered.

When such lime is added to a molten steel, the $CO_2$ gas is produced, which $CO_2$ gas serves to dilute the water vapor produced from the lime or other additives with a result that the movement of hydrogen to the molten steel is prevented.

It is thus possible to lower the hydrogen content of the molten steel.

The fluxing of the lime is accelerated since an effective agitation is conducted by the produced $CO_2$ gas in the boundary of the molten slag and unfluxed lime. Moreover, the lime thus treated hardly becomes powders due to shock or wear, because it is surrounded by the film of $CaCO_3$.

In case that the conversion rate to $CaCO_3$ is smaller than 2%, the effect of lowering of hygroscopic property of lime or prevention of movement of hydrogen to a molten steel is decreased, while in case that it exceeds 30%, a defect similar to that encountered in the use of the limestone instead of the quicklime occurs.

EXAMPLE 1

A limestone was calcined in a rotary kiln using a heavy oil as a fuel. The CaO, or quicklime thus obtained was a mixture of lump, particle and powder and the temperature used was more than 900° C. It was sieved by the use of an oscillation sieve to obtain a controlled particle size of 10 mm$\phi$ to 30 mm$\phi$, rejecting lump and powder. It was intended to obtain easily the almost uniform conversion by $CO_2$ gas to $CaCO_3$ with respect to each particle in the next step and to make uniform the reactivity and workability in the steel-making furnace.

The CaO particles having the size adjusted were introduced to a test rotary furnace, which was rotated, while a $N_2$ gas or air having low moisture content is introduced, so that the CaO particles were cooled to a predetermined temperature. The reason is as follows:

The CaO particles are allowed to react with the $CO_2$ gas more drastically as the temperature is higher. The reaction heat produced will increase the temperature of the CaO particles so that the reaction is accelerated more and more. The thickness of a film of $CaCO_3$ to be produced on the surface of the CaO particles does not need to be thick, so long as the thickness is substantially uniform. If the film is thick, the ratio of the limestone becomes large which gives rise to a defect as mentioned above with undesirable result.

Table 1 shows typical results of tests Nos. 1 to 4, in which the amount of CaO particles treated, the temperature used, the amount of $CO_2$ introduced, the amount of $CaCO_3$ converted and the amount of moisture absorbed are indicated. For reference, Table 1 also shows the amount of moisture absorbed by the CaO particles dried at high temperature in test No. 5 and by the normal CaO particles in test No. 6.

Table 1

CO₂ treatment conditions and results

| Test No. | Kind of lime used | CO₂ treatment conditions | | | Time kept for main reaction zone (min.) | Result of test | |
|---|---|---|---|---|---|---|---|
| | | Amount treated (Kg/charge) | Temperature of main reaction zone (° C) | Amount of CO₂ passed (m³/H) | | Conversion to CaCO₃ (%) | Amount of moisture absorbed (%) |
| 1 | Isothermal reaction CO₂-treated lime | 71 | 515 – 525 | 8.5 – 9.5 | 22 | 6.8 | 0.04 – 0.08 |
| 2 | '' | 73 | 530 – 545 | 10.0 – 10.7 | 38 | 8.1 | 0.02 – 0.07 |
| 3 | '' | 70 | 600 – 610 | 12.1 – 13.0 | 58 | 14.2 | 0.02 – 0.04 |
| 4 | Cooling reaction CO₂-treated lime | 70 | (600 – 300) | 7.2 | — | 8.5 | 0.07 – 0.11 |
| 5 | High temperature dried lime | — | — | — | — | — | 0.05 – 0.10 |
| 6 | Non-treated lime | — | — | — | — | — | 2.1 – 2.7 |

In Table 1, the amount of moisture absorbed (%) was calculated after the lime was allowed to stand for 16 hours in an atmosphere of $PH_2O = 15 - 20$ mm/Hg. In test No. 5, the lime was reheated at 900° C for 360 minutes, and immediately thereafter the content of water was analysed.

Figure 4:
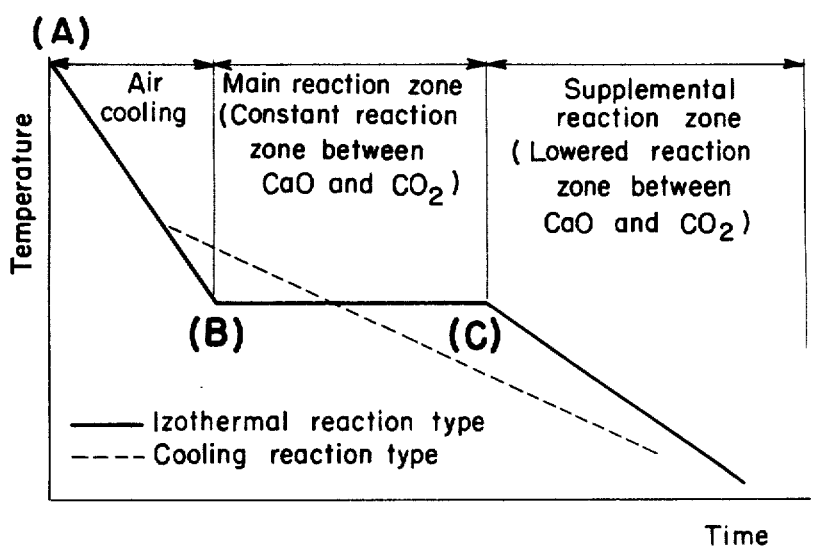
FIG. 4 shows the change of reaction temperature between CaO and $CO_2$.

In this example, the change of temperatures of CaO in the above-mentioned test rotary furnace is shown in FIG. 4, wherein the isothermal reaction zone is called as the main reaction zone and the subsequent cooling zone as the supplemental reaction zone.

The initial temperature (A) of the CaO particles introduced into the rotary furnace was about 900° C. When it was rotated and cooled in the air, the initial temperature (B) for the CO₂ gas reaction was selected as 515° C to 525° C, 530° C to 545° C and 600° C to 610° C for the isothermal reaction type as shown in Table 1. These temperatures were kept as they were until they reach the end point (C) under the substantially constant supply of CO₂ gas and cooled to an ordinary temperature in the subsequent supplemental reaction zone while CO₂ gas was supplied also.

It has been found from the above isothermal reaction test that the reaction temperature of the main reaction zone should preferably be 300° C to 750° C and, most preferably, 400° C to 650° C.

The amount of CO₂ introduced for keeping the temperature may be determined substantially by the amount of heat discharged from the furnace, the amount of CaO treated, the particle size of the treated CaO, etc. However, the amount of CO₂ gas supplied can be more precisely controlled by electrically connecting a thermocouple inserted into a predetermined position inside the Cao particle layer and a valve for supplying the gas. As for the cooling reaction type in which the amount of CO₂ gas supplied is smaller than that of the isothermal reaction type, the temperature decreases gradually as shown in FIG. 4 since the generation of heat does not amount to the discharge of heat. In this case, the temperature of the CaO particles decreases locally and rapidly so that a reaction film can not be formed satisfactorily. Thus the amount of moisture absorbed in this case becomes somewhat larger than that of the case of the isothermal type. On the other hand, when the amount of CO₂ gas supplied is in excess, the heat generated becomes larger than the heat discharged whereby the temperature of CaO particles is elevated and the thickness of the film becomes too large. This is why the CO₂ gas reaction should be carried out in almost equal temperature.

As shown in Table 1, the amount of moisture absorbed in Tests Nos. 1, 2 and 3 for the isothermal reaction type is 0.04 to 0.08, 0.02 to 0.07 and 0.02 to 0.04% by weight, respectively, which has been determined after standing for 16 hours is an atmosphere of $PH_2O$ being 15 to 20 mm/Hg, and the amount of moisture absorbed in Test No. 4 for the cooling reaction type is 0.07 to 0.11% by weight determined in the same manner as above. These values are all quite small, i.e., one several tenth of the value of 2.1 to 2.7% in the case of non-treated lime, which display an excellent moisture-proof effect not inferior to the value of 0.05% to 0.10% in Test No. 5 for the Cao which has been dried at high temperature for long time directly before use.

EXAMPLE 2

The effect of the end point of the treating temperature was studied with respect to the treatment conditions shown in Example 1. As shown in FIG. 3, the end point of the treatment temperature has a strong effect upon the moisture-proofness of the material treated. The comparison of the end points with respect to the material treated with the same conversion rate of CaCO₃ shows that the amount of moisture absorbed at the end point of 400° C is several times larger than that of 300° C. The difference becomes smaller if the end point becomes 350° C or less. In case of 300° C or less, the appreciable effect of the end point can not be observed. From this it can be said that the end point should preferably be 350° C or less.

The effect of the cooling rate in the vicinity of the end point temperature has been observed, whereby it can be recognized that for a satisfactory moisture-proofness it is necessary to effect gradual cooling from 400° C to 300° C for at least 20 minutes. The cooling rate also depends upon the heat discharged from the furnace, the amount of lime used and the concentration of CO₂ gas used. When the concentration of CO₂ becomes 20% or less, a satisfactory cooling rate can not sometimes be obtained by the reaction heat only. If, however, an adiabatic means to prevent the heat discharged from the furnace or a positive heating means from outside is given, the lower concentration of the reaction gas can be used.

EXAMPLE 3

In refining in a LD converter, a lime treated by $CO_2$ gas according to this invention with the conversion rate to $CaCO_3$ of 5.2% to 5.8% was used as a source for CaO, which was compared with the use of an ordinary quicklime. The amount of lime used was about 35 Kg/t-steel as CaO. The result is shown in Table 2.

Table 2

| Kind of lime used | Number of heat | Content of water in lime directly before use | Average blow end C (%) | Average blow end P (%) | Average blow end H (ppm) |
|---|---|---|---|---|---|
| $CO_2$-gas treated lime | 3 | 0.2 to 0.4% (Average 0.3%) | 0.08 | 0.012 | 0.9 |
| Ordinary quicklime | 5 | 3.5 to 5.4% (Average 4.8%) | 0.08 | 0.014 | 1.5 |

EXAMPLE 4

In the reducing period of a refining in an electric furnace, a lime treated by $CO_2$ gas according to this invention with the conversion rate to $CaCO_3$ of 6.3% to 6.6% was used as a source for CaO, which was compared with the use of an ordinary quicklime. The amount of lime used was about 20 Kg/t-steel as CaO. The result is shown in Table 3.

Table 3

| Kind of lime used | Number of heat | Content of water in lime directly before use | H (ppm) at end of oxidizing period | H (ppm) at end of reducing period | S (%) at end of reducing period |
|---|---|---|---|---|---|
| $CO_2$-gas treated lime | 3 | 0.1 to 0.3% (Average 0.2%) | Average 1.3 | Average 2.0 | Average 0.003 |
| Dried quicklime | 4 | 1.1 to 2.0% (Average 1.5%) | Average 1.3 | Average 3.8 | Average 0.004 |

EXAMPLE 5

A molten steel which was decarbonized and dephosphorized in a converter was passed to a ladle, to which lime, fluorspar and alumina were added, and a slag refining was conducted by arc heating. A lime treated by $CO_2$ gas according to this invention with the conversion rate to $CaCO_3$ of 6.5% to 6.9% was used as a source of CaO, which was compared with the use of an ordinary dried quicklime. The amount of lime used was about 15 Kg/t-steel as CaO.

The result is shown in Table 4.

Table 4

| Kind of lime used | Number of heat | Content of water directly before use | Converter blow end H (ppm) | Ladle refining end H (ppm) | ΔH (ppm) |
|---|---|---|---|---|---|
| $CO_2$-gas treated lime | 5 | 0.1 to 0.3% (Average 0.2%) | Average 1.3 | Average 2.1 | 0.8 |
| Dried quicklime | 4 | 1.1 to 2.0% (Average 1.5%) | Average 1.4 | Average 4.5 | 3.1 | remarks: ΔH = Hydrogen pick up during ladle refining

EXAMPLE 6

In this example, a graphite electrode used had a hole pierced through the center. Argon gas was supplied from outside this hollow part. The diameter of the electrode was 350 mm; the diameter of the hollow part was 21 mm; and the amount of Ar supplied to the hollow part was 100 $l$/min per one electrode. Under these conditions, the same $CO_2$-treated lime as that of Example 3 was used. The result was that the converter blow end H was 1.5 ppm (average), while the ladle refining end H was 1.9 ppm (average) and ΔH was 0.4 ppm.

EXAMPLE 7

At tapping of a molten steel from a 60t converter, a mixture of lime, fluorspar and iron oxide was added to a ladle receiving said steel. The time for tapping was 4 to 5 minutes. As a lime source, a $CO_2$-gas treated lime according to this invention with the conversion rate to $CaCO_3$ of 6.4% to 6.6% was used, which was compared with the use of an ordinary quicklime. The added materials were 5.0 Kg/t-steel of lime as CaO, 2.3 Kg/t-steel of iron oxide, 1.8 Kg/t-steel of fluorspar and 0.9 Kg/t-steel of alumina.

The result was shown in Table 5.

Table 5

| | | C | P | H |
|---|---|---|---|---|
| At blow end of converter | | 0.08% | 0.018% | 1.2 ppm |
| After tapping | $CO_2$-treated lime used | 0.07% | 0.009% | 1.3 ppm |
| | Quicklime used | 0.07% | 0.012% | 1.9 ppm |

As set forth hereinabove, particularly with respect to the Examples, the practice of this invention makes it possible to produce a quicklime at low cost which has an extremely decreased hygroscopic property. Accordingly, when it is applied to a converter, electric furnace, ladle furnace, electroslag furnace and the like, the content of hydrogen in steel can be remarkably decreased as compared with the prior art, whereby a vacuum degassing means for molten steel or a dehydrogenating heat treatment for steel material can be omitted and yet quite the same effect as that given when the ordinary CaO is dried for a long time just before use with a special equipment and considerable fuel used can be obtained. Thus the advantage of this invention is very remarkable from the viewpoint of the production steps.

We claim:

1. A method for making a flux for use in a steel making operation to reduce the hydrogen content of steel produced by such operation, said flux being characterized by having excellent moistureproof property, which method comprises calcining a material selected from the group consisting of limestone and dolomite to decompose said material to produce calcium oxide, and immediately thereafter uniformly reacting the outer surfaces of particles of said material with a sufficient amount of a carbon dioxidecontaining gas to convert from about 2% to about 30% by weight of the calcium oxide in said particles to a film of calcium carbonate on said particles.

2. The method according to claim 1 in which said carbon dioxide-containing gas contains at least 20% carbon dioxide.

3. The method according to claim 1 in which the reacting of the material with the carbon dioxide-containing gas is carried out at temperatures between 300° C and 750° C.

4. The method according to claim 1 in which the particles of decomposed material are subjected to mutual movement with each other while said reaction is being carried out to effect uniform reacting of the surfaces thereof with the carbon dioxide-containing gas.

5. The method according to claim 1 in which the reacting of the material with the carbon dioxide-containing gas is completed at the final temperature of 350° C or less.

6. The method according to claim 3 in which the reacting of the material with the carbon dioxide-containing gas is completed by effecting a gradual cooling from about 400° C to about 300° C for at least 20 minutes.

7. The method according to claim 1 in which the carbon dioxide-containing gas contains the carbon dioxide produced by decomposition of the material.

8. The method according to claim 1 in which the decomposed material is sieved in an oscillating sieving operation to remove lumps and powders therefrom, the remaining decomposed material being subjected to adjustment of the particle size thereof before reacting with same with the carbon dioxide-containing gas.

9. A flux produced in accordance with the method of claim 1.

* * * * *